United States Patent
Mattiocco et al.

(10) Patent No.: US 8,010,240 B2
(45) Date of Patent: Aug. 30, 2011

(54) METHOD AND SYSTEM FOR ELECTRICITY CONSUMPTION PROFILE MANAGEMENT FOR CONSUMER DEVICES

(75) Inventors: Attilio Mattiocco, Rome (IT); Vincenzo Sciacca, Rome (IT); Massimo Villani, Rome (IT)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 12/323,206

(22) Filed: Nov. 25, 2008

(65) Prior Publication Data

US 2010/0131117 A1   May 27, 2010

(51) Int. Cl.
*G05B 11/01* (2006.01)
(52) U.S. Cl. ........................................ 700/296; 700/295
(58) Field of Classification Search .................. 700/295, 700/296
See application file for complete search history.

(56) References Cited

U.S. PATENT DOCUMENTS

| | | | |
|---|---|---|---|
| 4,247,786 | A | 1/1981 | Hedges |
| 5,544,036 | A | 8/1996 | Brown, Jr. et al. |
| 7,010,363 | B2 | 3/2006 | Donnelly et al. |
| 7,069,117 | B2 | 6/2006 | Wilson et al. |
| 7,123,994 | B2 | 10/2006 | Weik et al. |
| 2003/0233201 | A1 * | 12/2003 | Horst et al. ...................... 702/62 |
| 2004/0075419 | A1 | 4/2004 | Massey et al. |
| 2005/0187727 | A1 * | 8/2005 | Weik et al. ...................... 702/61 |
| 2008/0172312 | A1 * | 7/2008 | Synesiou et al. ................. 705/34 |
| 2010/0070103 | A1 * | 3/2010 | Fleck et al. ..................... 700/296 |
| 2010/0082174 | A1 * | 4/2010 | Weaver .......................... 700/295 |

FOREIGN PATENT DOCUMENTS

WO   W02007027063 A1   3/2007

OTHER PUBLICATIONS

Mak, Sioe T., et al., "Power Frequency Communications on Long Feeders and High Levels of Harmonic Distortion", IEEE Transactions on Power Delivery, Oct. 1995, pp. 1731-1736, vol. 10, No. 4.
News Release for Aclara TWACS (Two-Way Automatic Communication System), "Aclara Demand Response Offers More Data, Greater Control," published on Sep. 8, 2008, located at http://www.aclaratech.com/PressReleases/9-08-08%20DRU%20FINAL.pdf.

(Continued)

*Primary Examiner* — Ryan A Jarrett
(74) *Attorney, Agent, or Firm* — Kenneth L. Sherman, Esq.; Michael Zarrabian, Esq.; Myers Andras Sherman & Zarrabian LLP

(57) ABSTRACT

A method and system for electricity consumption profile management for electrical devices, is provided. One implementation involves receiving an energy consumption control command at a consumer site including on or more electrical devices connected to an energy distribution network; determining energy consumption adjustment including determining an energy consumption adjustment for at least one of the electrical devices based on the energy consumption control command; and transmitting an energy consumption adjustment message to said at least one of the electrical devices, commanding the electrical device to adjust its electrical energy consumption accordingly.

20 Claims, 13 Drawing Sheets

OTHER PUBLICATIONS

Brent A. Miller, "The autonomic computing edge: Keeping in touch with touchpoints", published Aug. 2, 2005, at http://www.ibm.com/developerworks/autonomic/library/ac-edge5/.
Electricity Meter from Wikipedia, the free encyclopedia, published at http://en.wikipedia.org/wiki/Electricity_meter#Smart_meters, last modified Aug. 18, 2008.
Henrique Serra, et al., "Domestic Power Consumption Measurement and Automatic Home Appliance Detection" IEEE International Workshop on Intelligent Signal Processing, Sep. 1-3, 2005, pp. 128-132.
Govender, P., "A Load Shedding Controller for Management of Residential Loads During Peak Demand Periods" IEEE, AFRICON, 2004, 7th AFRICON Conference in Africa, Published Sep. 15-17, 2004, vol. 2, pp. 729-734.

* cited by examiner

| STATE | CONSUMPTION FACTOR | USER IMPACT | FUNCTION | DURATION AVERAGE (e.g.seconds) | DURATION VARIANCE (e.g.seconds) | DURATION TYPE |
|---|---|---|---|---|---|---|
| 1 | 0 | 0 | OFF | | | USER (interactive) |
| 2 | 5 | 0 | STANDBY | | | USER |
| 3A | 100 | 0 | FUNCTION1 | | | CONTEXT |
| 3B | 90 | 15 | FUNCTION1 | | | CONTEXT |
| 3C | 80 | 30 | FUNCTION1 | | | CONTEXT |
| 3D | 70 | 45 | FUNCTION1 | | | CONTEXT |
| 4A | 100 | 0 | FUNCTION2 | | | CONTEXT |
| 4B | 90 | 15 | FUNCTION2 | | | FIXED |
| 5 | 100 | 0 | FUNCTION3 | | | FIXED |

| CURRENT STATE | FUTURE STATE | DURATION |
|---|---|---|
| 1 | 2 | |
| 2 | 3A, 3B, 3C | |
| 3A | 3B, 3C, 3D, | |
| 3B | 3A, 3C, 3D | |
| 3C | 3A, 3B, 3D | |
| 3D | 3A, 3B, 3C | |
| 4A | 4B | |
| 4B | 4A | |
| 5 | 5 | |

FIG. 5B

METHOD AND SYSTEM FOR ELECTRICITY CONSUMPTION PROFILE MANAGEMENT FOR CONSUMER DEVICES

BACKGROUND OF THE INVENTION

1. Field of the Invention

The invention relates generally to controlling electricity consumption, and in particular, to managing electricity consumption for consumer devices.

2. Background Information

Many electric energy utilities (suppliers) strive for centrally managing energy demand. This is because, without acquiring specialized equipment, electricity cannot be "stored" at a typical consumer site when not needed. Further, black-outs may occur when there is insufficient electricity for consumption demand. Energy consumption shows well-known demand patterns during the day, months and seasons. Summer, for example, is particularly critical because demand for residential consumers rises mostly because of air conditioning. Despite accurate forecasting methods available (e.g., weather forecasting, trend analysis on historical data) many electricity utilities may still face a +/−5% or larger, error in energy consumption prediction.

As there is no practical way to reduce the amount of energy demand by residential and industrial consumers, the usual approach has been to apply a type of "moral suasion", and when the energy supplied is not sufficient, the result is black-outs. Partial solutions exist for disconnecting certain energy consuming devices (e.g., Aclara Two-Way Automatic Communications System (TWACS) Technology (devices)) but a drawback is that energy consuming devices are not designed to gracefully shape their consumption according to current energy demand.

SUMMARY OF THE INVENTION

The invention provides a method and system for electricity consumption profile management for consumer devices. One embodiment includes receiving an energy consumption control command at a consumer site including one or more electrical devices connected to an energy distribution network; determining energy consumption adjustment including determining an energy consumption adjustment for at least one of the electrical devices based on the energy consumption control command; and transmitting an energy consumption adjustment message to said at least one of the electrical devices, commanding the electrical device to adjust its electrical energy consumption accordingly.

Other aspects and advantages of the invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the invention, as well as a preferred mode of use, reference should be made to the following detailed description, read in conjunction with the accompanying drawings, in which:

FIGS. 5A-B shows example tables of device states and corresponding energy consumption levels, according to an embodiment of the invention.

DESCRIPTION OF THE PREFERRED EMBODIMENTS

Figure 1:
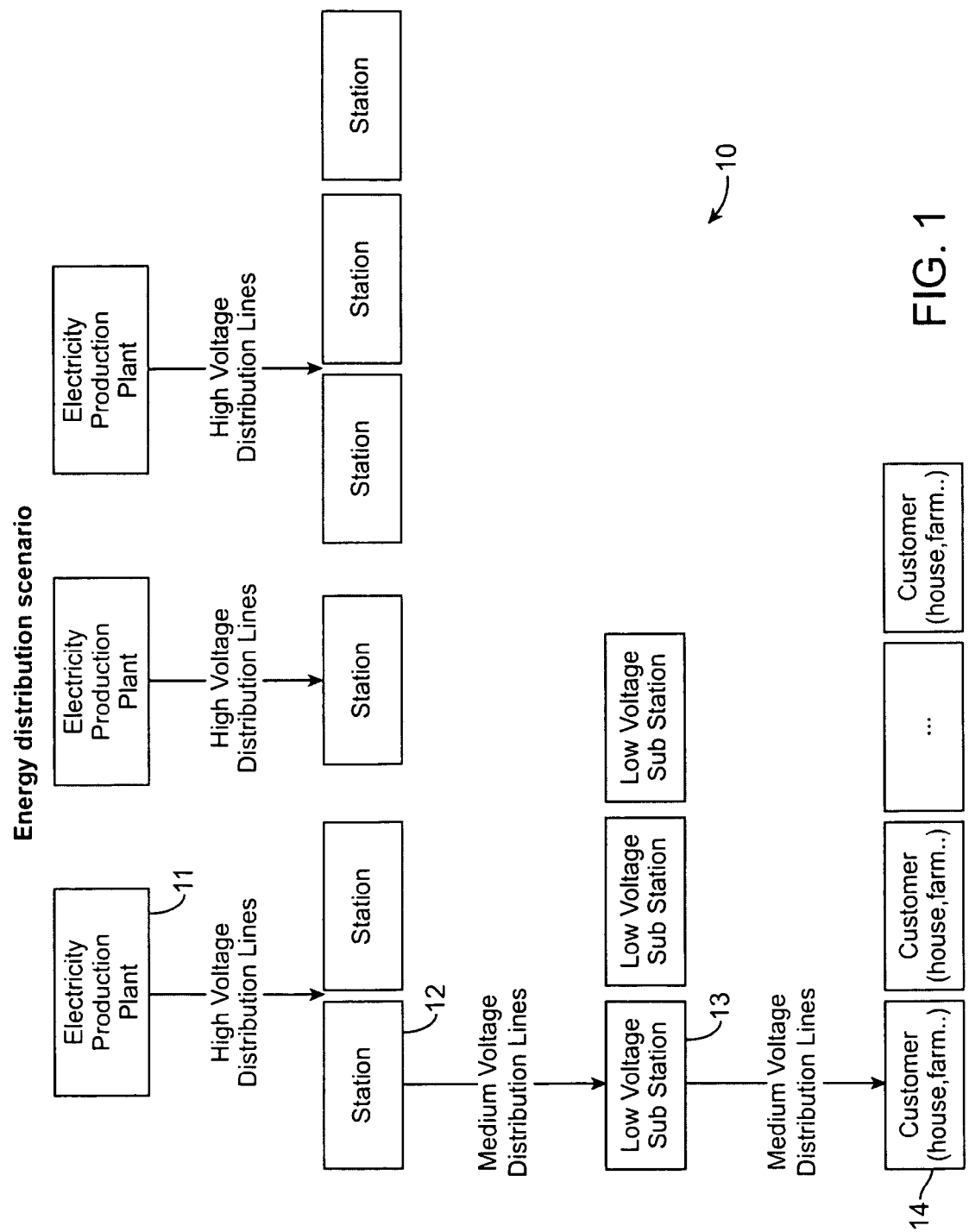
FIG. 1 shows a block diagram of an electrical energy distribution network implementing an embodiment of the invention.

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The invention provides a method and system for electricity consumption profile management for consumer devices. One embodiment involves controlling the amount of electrical energy consumed by devices in an electrical network, and hence, control of the total amount of power consumed by the network. The devices are capable to work with different levels of power consumption and the network is capable of managing the devices by switching the device consumption levels as needed. This allows for providing an "end user defined" energy consumption threshold for energy saving purposes. The capability to control even a small amount of consumption (e.g., consumption by a device that is on standby), in a collection of consumer sites, can lead to a large (e.g., one power plant) energy saving for the energy utilities.

One implementation of the invention includes providing a message-based protocol (e.g., Energy Consumption Control Message (ECCM), preferably encoded or a power line communication (PLC) encoded, according to the available network protocol), between an energy utility and consuming electrical devices (e.g., appliances, consumer electronics), and providing an autonomic architecture for each involved electrical appliance, in order for the utility to send a broadcast message to the consuming devices, wherein the message includes "consumption profile" change for devices that are able to receive, understand and react to such a consumption profile.

Many electrical devices are marked "statically" with an indication for energy class (e.g., a class A device consumes less than a class B device). This means that when such devices operate without user restrictions, they consume, at most, a certain amount of KWh electrical energy. The invention provides a dynamic energy consumption classification for devices with a control interface available to energy utilities. Each device is equipped with a control module that can be instructed, via the control interface, to change the device consumption behavior "on demand", based on a consumption profile. Based on the "on demand" profile, the device energy consumption is limited to specific values (e.g., reducing its performance, excluding some functions or, in the worst case, switching the device off). With this flexible control, energy utilities can essentially optimize electrical power consumption in a network of devices, thereby shaping the energy demand load, avoiding the risk of black-outs and generally improving allocation planning for power generators. As such, the energy utilities are provided with a mechanism to control the overall energy consumption at consumer device level.

FIG. 1 shows an example of electricity distribution in a hierarchical network 10 (distribution network), starting from a power plant 11 to a power station 12 with high voltage lines, then to substations 13 with medium voltage lines and, from there, to customer devices 14 on low voltage lines. The utility can communicate with the consumer devices using ECCM technology or other network infrastructure that is able to support a message based protocol. In the examples below, ECCM is implemented as PLC, though those skilled in the art recognize that other protocols may also be used.

According to an implementation of the invention, the consumer devices are further equipped with a communication module to communicate indirectly with the utility using a message based protocol. The communication module of each device is able to communicate directly with a gateway device in each customer site and this latter one communicates with the utility directly or, e.g., by connecting to an e-emeter (electronic energy meter or smart meter) already in place in each customer site, leveraging the existing utility infrastructure. The communication module then communicates with said control module in the device for detailed energy consumption control. The e-meter is a device energy providers currently use to measure (for further billing) the electric energy consumption at a distribution point (e.g., residential customer). Previously, electro-mechanic metering devices were used to measure the amount of energy consumed with visual indicators, wherein an operator reads that amount by visiting the distribution point. Some electro-mechanic metering devices remain in operation. The e-meter adds to the basic function of electro-mechanic metering devices by providing an embedded controller (e.g., processor, logic circuit, firmware) providing further functions. One such function is the hour-by-hour measurement of energy consumption and storage of measured consumption values (i.e., "load-profile") for more complex tariff definitions (e.g., energy being less expensive during the night). Another such function is capability to communicate with an energy provider's control room for remote reading of the energy measurement stored in the e-meter and other operations, such as remotely issuing a disconnect of the energy in case of fraud or lack of payments due. Variations of the e-meter provide increasing levels of automation to the basic remote metering functionality (e.g., (AMR) Automated Meter Reading).

The network 10 includes Advanced Metering Infrastructure (AMI) for energy distribution, which includes e-meters in customer sites.

Figure 2:
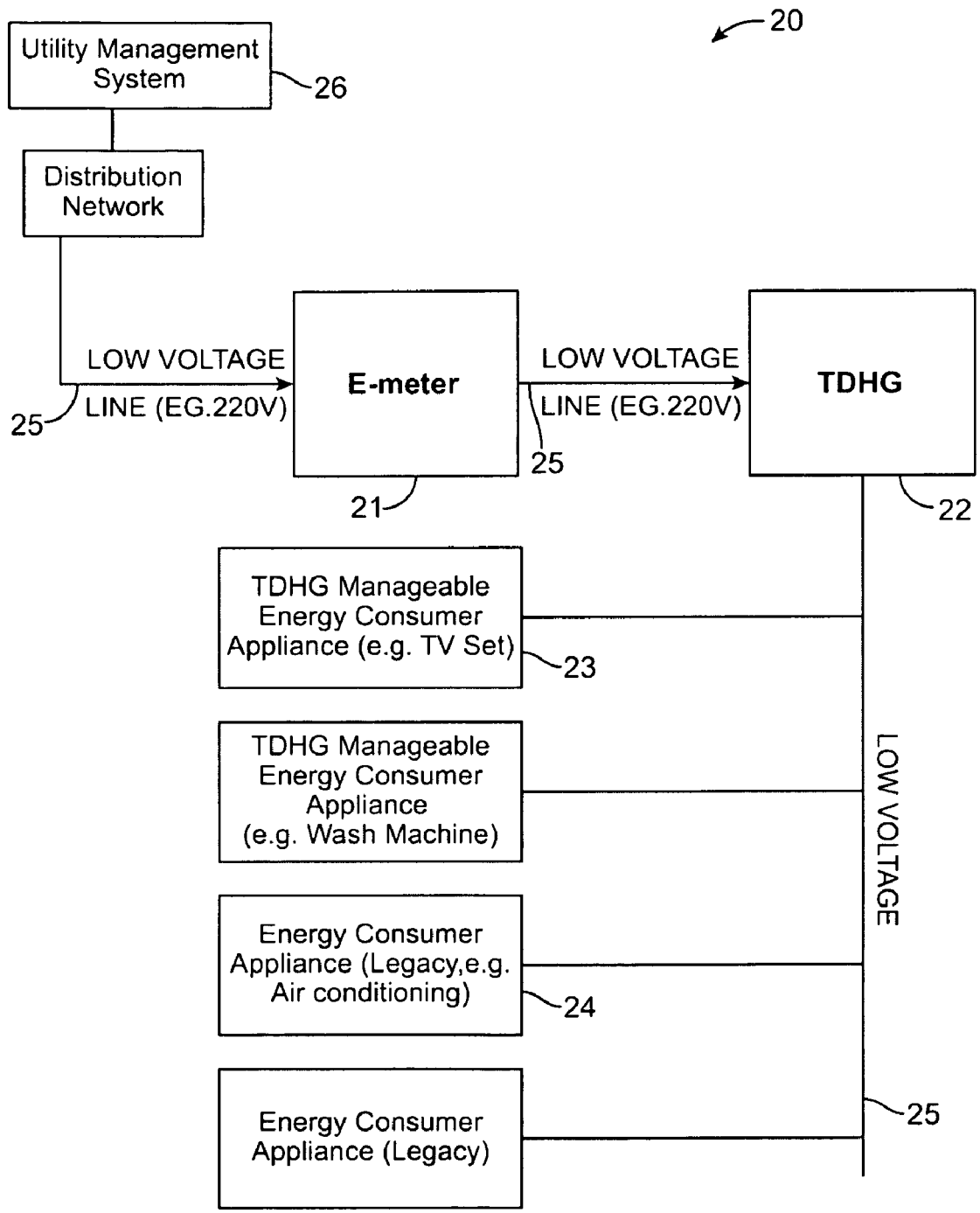
FIG. 2 shows a functional block diagram of an electrical network in a consumer site implementing electricity consumption profile management for consumer devices at the consumer site, according to an embodiment of the invention.

FIG. 2 shows an example consumer site 20, including an e-meter 21, a device gateway (TDHG) 22, one or more TDHG manageable electrical devices (MEDs) 23, and, optionally, one or more legacy electrical devices 24, interconnected via the low voltage power lines 25.

The TDHG 22 (which may be standalone or embedded in the e-meter), communicates with an energy utility central management system 26 via the distribution network. The TDHG adapt messages from the management system 26 to consumer device capabilities, by generating a PLC message, according to the message transmitted by the management system 26. The TDHG 22 further manages local energy consumption policies, and manages device registrations and states.

Each MED 23 is capable of receiving PLC messages via a communication module, wherein a control module in the device modifies energy consumption (e.g., reduce performance) of the device in order to consume energy below a specified level (below an upper threshold).

In one embodiment, the invention implements an autonomic control module wherein the devices 23 function as effectors while the TDHG 22 functions as a sensor. One example of an autonomic system is the touch-point autonomic IBM technology (see Brent A. Miller, "The autonomic computing edge: Keeping in touch with touchpoints", Aug. 2, 2005, published at http://www.ibm.com/developerworks/autonomic/library/ac-edge5/, explaining that in an automatic computing system, touchpoints represent the manageability interfaces for the things that are managed. We call these things manageable resources. A touchpoint enables these resources to be managed in a single, standard manner, regardless of the type of resource. That is, a single standard manageability interface, as provided by a touchpoint, can be used to manage routers, or servers, or application software, or middleware, or any other manageable resource). The autonomic control module provides said interface for controlling power consumption of the involved device. At power on, during a registration phase, devices 23 and 24 are registered on the TDHG 22, such that all devices in the consumer site are classified in two groups: MEDs 23 that include said control interface and legacy devices 24 which cannot communicate with the TDHG 22. The TDHG is able to discriminate the legacy devices 24 by balancing the power consumption of the MEDs 23 by the total energy consumption.

During the registration phase, the TDHG 22 acquires information about the devices (e.g., type, name) and obtains a list of manageable states and relative consumption information in which manageable device 23 can enter on demand. An example MED 23 may comprise an LCD TV, which responds to the TDHG 22 with a list of five states from "switched off" to "on at normal brightness", with three intermediate states of brightness, corresponding to different energy consumption levels by the TV. In order to manage legacy devices 24, an AC plug/adapter can be provided for each device 24, to register the device and provide the TDHG 22 with a list of "switch on", "switch off" interfaces for the device.

Messages can be "critical", which cannot be ignored, and "not critical" when they are not mandatory. TDHG 22 can be programmed and configured by the end user in order to apply consumption management policies which must be validated online by the energy utility, and can implement energy consumption management processes leveraging device consumption classes with consumption profiles information.

In one example, when a message arrives at the TDHG 22 from the utility management system 26 to switch to $1/10$ of the overall power consumption of the substations, the TDHG 22 adapts the consumption message to the most appropriate for each specific device 23, 24, according to the registered states of the devices with the TDHG 22 at the corresponding consumer site.

Energy consumption control messages (ECCM) from the utility management system 26 to the TDHG 22 may also comprise structure text messages (e.g., XML) that include supply point coordinates that identify a consumer site (customer site) targeted for consumption reduction, a percentage of the consumed power that the consumer site is expected to reduce, the time units (in seconds), after which, the control message expires, and the time, after which, the consumer site can return to normal consumption.

Messages exchanged between the TDHG 22 and the MEDs 23 may comprise structure text messages that include device coordinates (to identify the device). The messages from the MEDs 23 additionally include payload data describing the state information for the device (e.g., one or more of: current state and related consumption, forecast state duration).

Control messages from the TDHG 22 to the devices in the consumer site comprise control information including demands (requests) to a device to enter a particular state (e.g., low brightness state for a TV, low drying heat for a clothes dyer). Other messages exchanges may include acknowledge information to validate information exchange. Other control information from the TDHG 22 to the devices in the consumer site may include commands to clear prior commands (e.g., transition a device to another state such as clearing a low consumption request).

Figure 3:
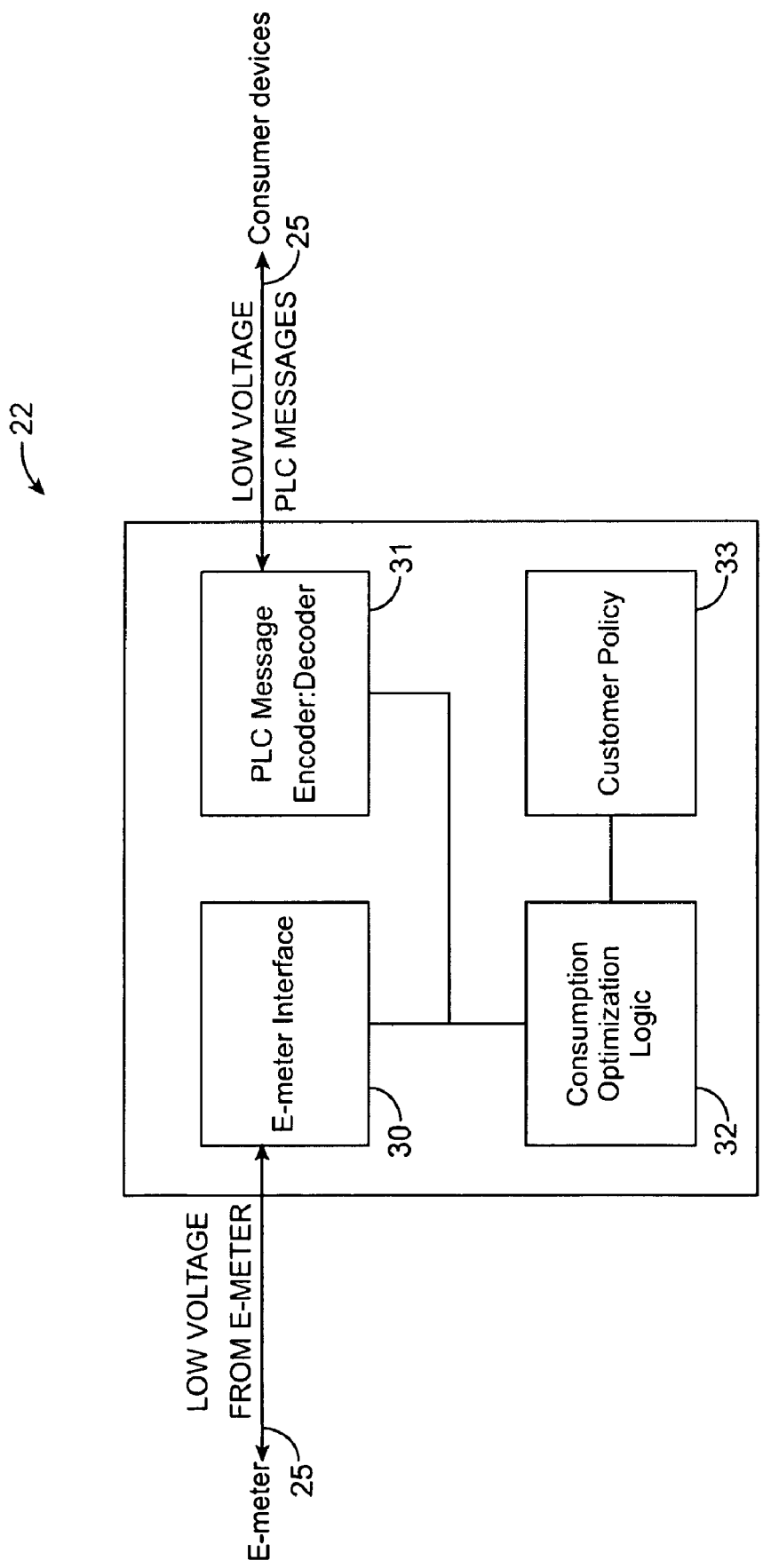
FIG. 3 shows a functional block diagram of a consumer site gateway, according to an embodiment of the invention.

FIG. 3 shows a functional block diagram of a TDHG 22 according to an embodiment of the invention. The TDHG 22 includes an e-meter interface 30, a PLC message codec (encoder/decoder) module 31, an optimization logic module 32 and a customer policy module 33. The e-meter interface 30 provides an interface with the e-meter 21 (FIG. 2) for receiving energy consumption control messages from the utility management system 26. The PLC message codec 31 functions to translate the energy consumption control messages from the utility into PLC messages for MEDs 23 connected to the internal site power line (low voltage) 25.

The consumption optimization logic module 32 is configured for registering devices determining device states. At power-on, the consumption optimization logic module 32 causes a message to be broadcast on the internal power line 25 to the devices in the consumer site 20, to signal presence of the TDHG 22 to the MEDs 23. Upon receiving response messages from the connected MEDs 23, the consumption optimization logic module 32 acquires, from each responding MED 23, at least: the list of operational states of that device, the list of possible transitions along with attributes of states and transitions. The consumption optimization logic module 32 stores the information obtained from each responding MED 23 in an internal table in memory, for later optimization when an energy consumption control command (e.g., energy consumption adjustment such as consumption reduction) is received from the utility management system 26 via the e-meter 21.

The consumption optimization logic module 32 can also retrieve, if not already provided, a current operational state from each MED 23 via a PLC message exchange. In one example, if the consumption optimization logic module 32 receives an energy consumption adjustment message from the utility management system 26 via the interface 30, the consumption optimization logic module 32 first evaluates the energy consumption that it can manage in the consumer site, by balancing the overall amount of energy consumed (from e-meter or direct measurement) and the amount of energy consumed by the connected devices (communicated by the devices).

The consumption optimization logic module 32 translates the amount of energy consumption adjustment, such as consumption reduction, requested by an energy consumption control message from the utility, into the amount of energy reduction needed by that consumer site. For example, the utility may request an energy consumption reduction of 3%, for an effective period of one hour, specified in the energy consumption control message. The consumer site is consuming 1000 KWh, and the acquired managed devices are consuming 600 KWh and a legacy device is consuming 400 KWh. The consumption optimization logic module 32 translates the 3% energy consumption reduction request from the utility into 3% of 1000 KWh, resulting in 30 Wh (that is 5% energy reduction of manageable electrical devices (MED)).

The consumption optimization logic module 32 then uses the table of possible states and transitions of all MEDs, their consumption attributes and their constraints, to compute an essentially optimal state transition (if any) to request each MED to perform. An optimization algorithm from operations research can be utilized by the module 32 for finding the highest reduction of consumption, as a target, and the lowest impact on the consumer site user, as a constraint. When the number of device states is low, a full state search can be used as a base algorithm.

The consumption optimization logic module 32, via the PLC coded 31, dispatches, to each MED, a control message, including the respective state change and acquires an acknowledge message. If a MED does not acknowledge the state change control message, or changes state according to normal operation (e.g., wash machine washing program), then the consumption optimization logic module 32 again computes an optimization cycle for that MED and dispatches a control message accordingly. This process continues until all the MEDs are in the requested operational states. After the stated effective period of the energy consumption control request from the utility ends, the consumption optimization logic module 32 sends a "reduction message expired" command to the MEDs allowing each MED to return to its normal working state. The consumer policy module 33 contains a set of rules the user can customize to alter the behavior of the states optimization logic. Without the customer rules, the optimization module works according to optimization principles (objective: target energy consumption, constraint: less impact to the user). If rules are present, the rules are used as a pre-processing filter before the optimization (e.g., the customer can exclude a particular device from being optimized during a certain time interval or a certain day, or can limit the energy limitation request to a certain amount). These additional constraints/rules are taken into consideration by the optimization module accordingly to reach the optimization (energy consumption reduction) target. In the above example of 1000 Wh consumed in certain timeframe and a request from utility to decrease by 3%, if the registered manageable devices account for a 600 Wh average load and the local customer policy reduces by an additional 100 Wh (because one or more of the loads are excluded by the rules for optimization in that timeframe), the optimization logic maps the original reduction target into the recomputed 10% energy consumption reduction request that is sent to the remaining manageable devices that are consuming 300 Wh.

Figure 4:
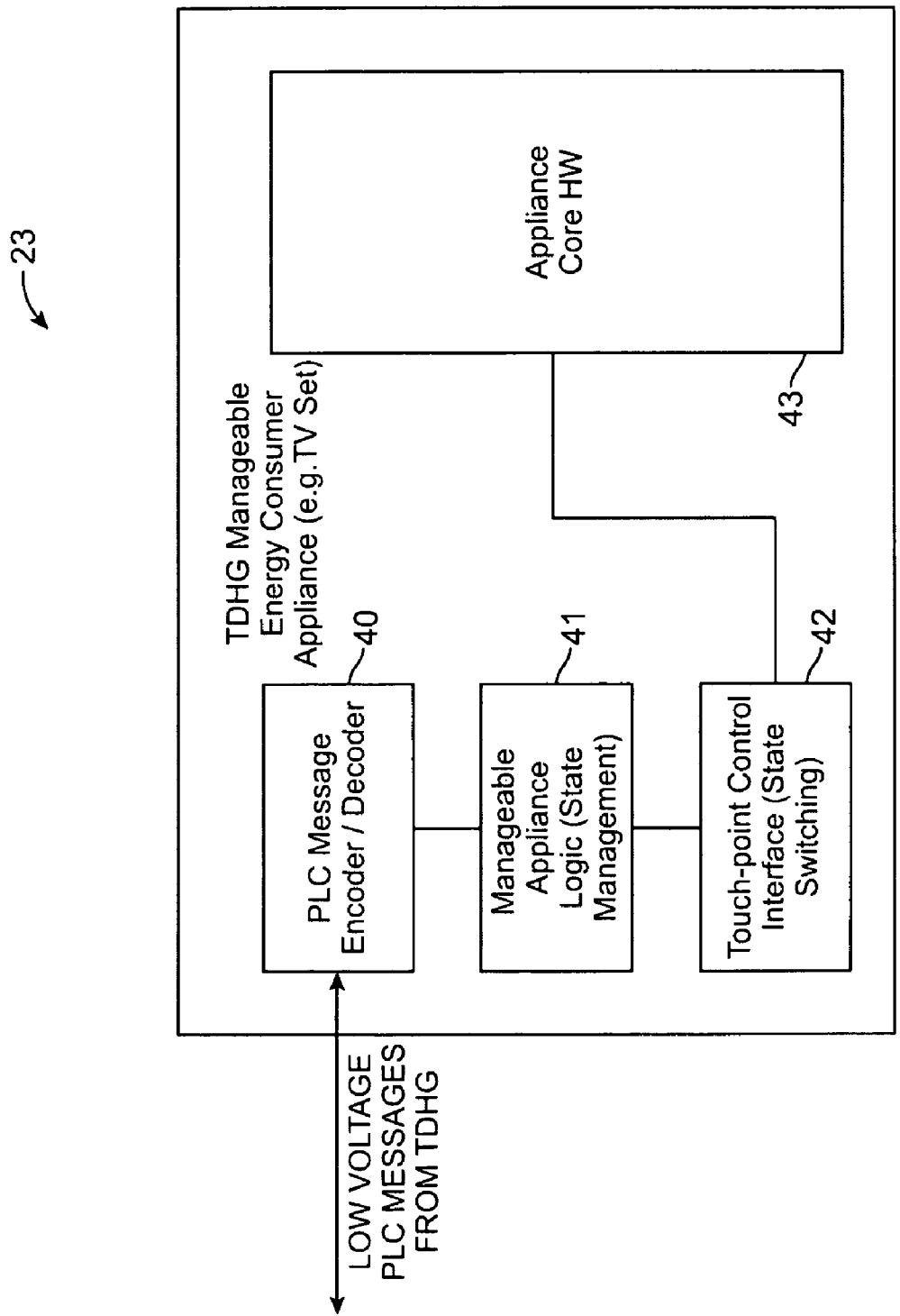
FIG. 4 shows a functional block diagram of a manageable device, according to an embodiment of the invention.

FIG. 4 shows a function block of a MED 23, according to an embodiment of the invention. The MED 23 includes a PLC message codec module 40, a state management module 41, a state switching interface module 42, and a device core hardware (core HW) 43. The modules 40-42 (e.g., processing functions) provide control function for the electrical hardware 43. The state switching interface module 42 functions to switch the hardware 43 between different states based on commands from the state management module 41.

The state management module 41 exchanges energy consumption protocol messages with the TDHG 22, via the codec 40. When powered on, the state management module 41 provides to the TDHG 22 (via a PLC message) a list of its operating states along with energy consumption for each state, allowing transitions between states that can be controlled by the TDHG 22 on behalf of the utility. FIGS. 5A-B show example tables 50A and 50B, including operating states and other information for a MED 23.

The state management module 41 maintains description and attributes for each state that can be used to prevent transitions in certain cases (health apparatus), or limit the transitions (impact on the user or user interactive activity state). Each state may also describe an average duration (e.g., various states of a wash machine program) or that an average duration is not meaningful (e.g., a computer with a interactive user). The state management module 41 notifies the TDHG 22, via a message of each state change, to allow the TDHG 22 to update its internal tables and to allow the TDHG 22 to refresh its optimization computation and send updated optimal states configurations to the MED 23.

Figure 6:
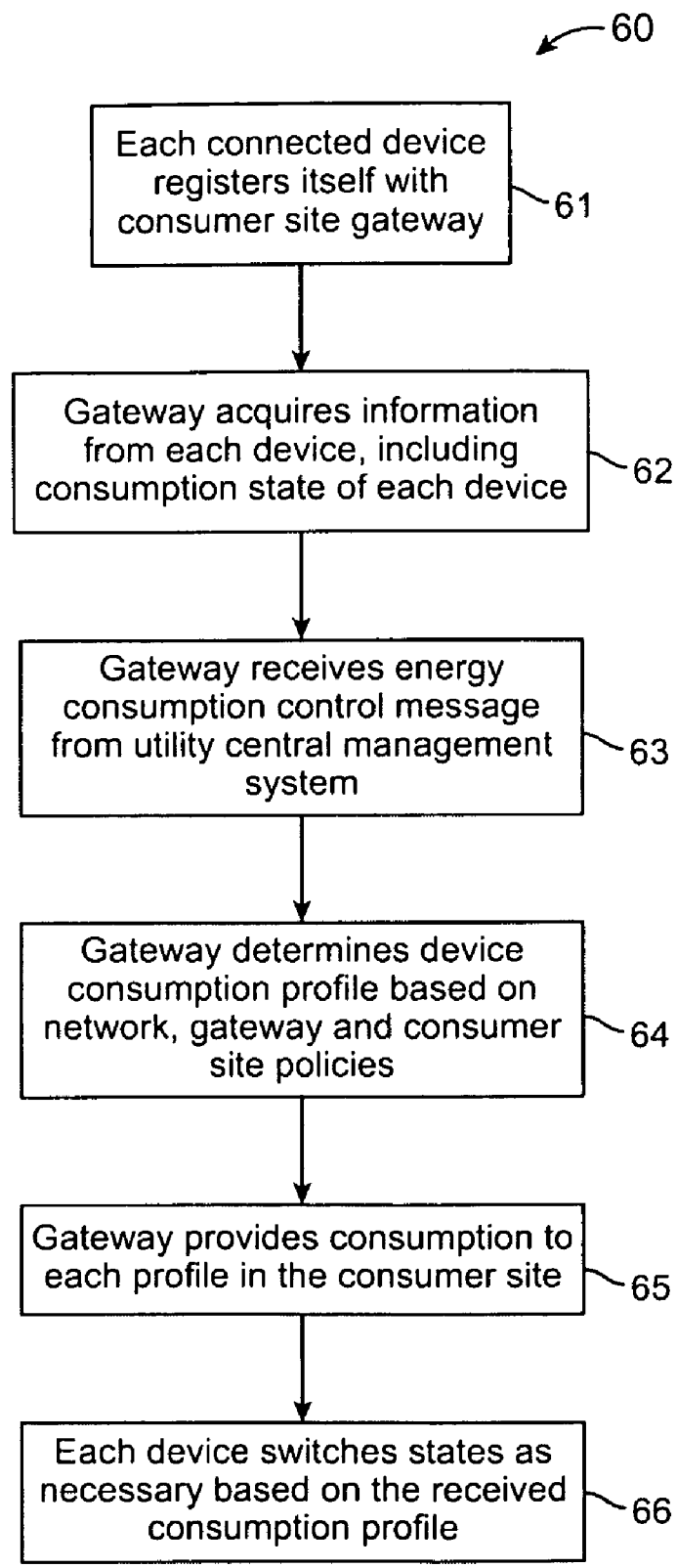
FIG. 6 shows a process for electricity consumption profile management for consumer devices at the consumer site, according to an embodiment of the invention.

FIG. 6 shows a flowchart of a process 60, implementing a process for electricity consumption profile management for consumer devices, according to an embodiment of the invention. In process block 61, when a device (e.g., MED 23) is connected to the electrical network (e.g., low voltage lines 25) in the consumer site, it registers itself to the available gateway (e.g., TDHG 22) via PLC message exchange. In process block 62, during the registration phase, the gateway acquires information about the device (e.g., type, name, the list of all available modes, such as manageable states and relative consumption information per state, which the device can enter on demand) via PLC message exchange. In process block 63 the gateway receives an energy consumption control message from the energy utility which provides a network consumption policy (e.g., to switch to 9/10 of the overall power consumption of the substations). In process block 64, the gateway combines the network consumption policy (energy consumption control from utility), any user policies (consumer site policies) and internal policies (e.g., TDHG built-in customizable policies), in order to determine a power consumption profile for each of the registered electrical devices in the consumer site. In process block 65 the gateway provides the power consumption profiles to each of the registered devices in the consumer site, via PLC control messages. In process block 66, each device switches to a specific state (or mode) based on the received profile. Accordingly, the gateway manages all the manageable devices in the consumer site in order to achieve a combined result, in terms of power consumption, that matches the required power consumption from the utility. The gateway in each consumer site performs the above operations.

As such, the invention uses operational modes of a device as a consumption class matrix/table (e.g., tables 50A, 50B in FIGS. 5A-B), and does not require device groups. The operational modes describe a set of manageable device states and relative consumption information. In determining a device energy consumption profile, the consumer site gateway can combine the network consumption policies with local user defined policies. Local user defined policies can include priorities and other relevant parameters. The gateway functions a central console for defining rules (energy consumption profiles) for managing all the electrical devices in a consumer site (in terms both of energy consumption and operating modes).

In another embodiment, the invention further provides applying local consumption policies (the ones desired by the end customer), adjusting the devices capabilities with respect to the actual usage of the devices themselves, in order to utilize a global consumption policies (the ones wanted by utilities).

Figure 7:
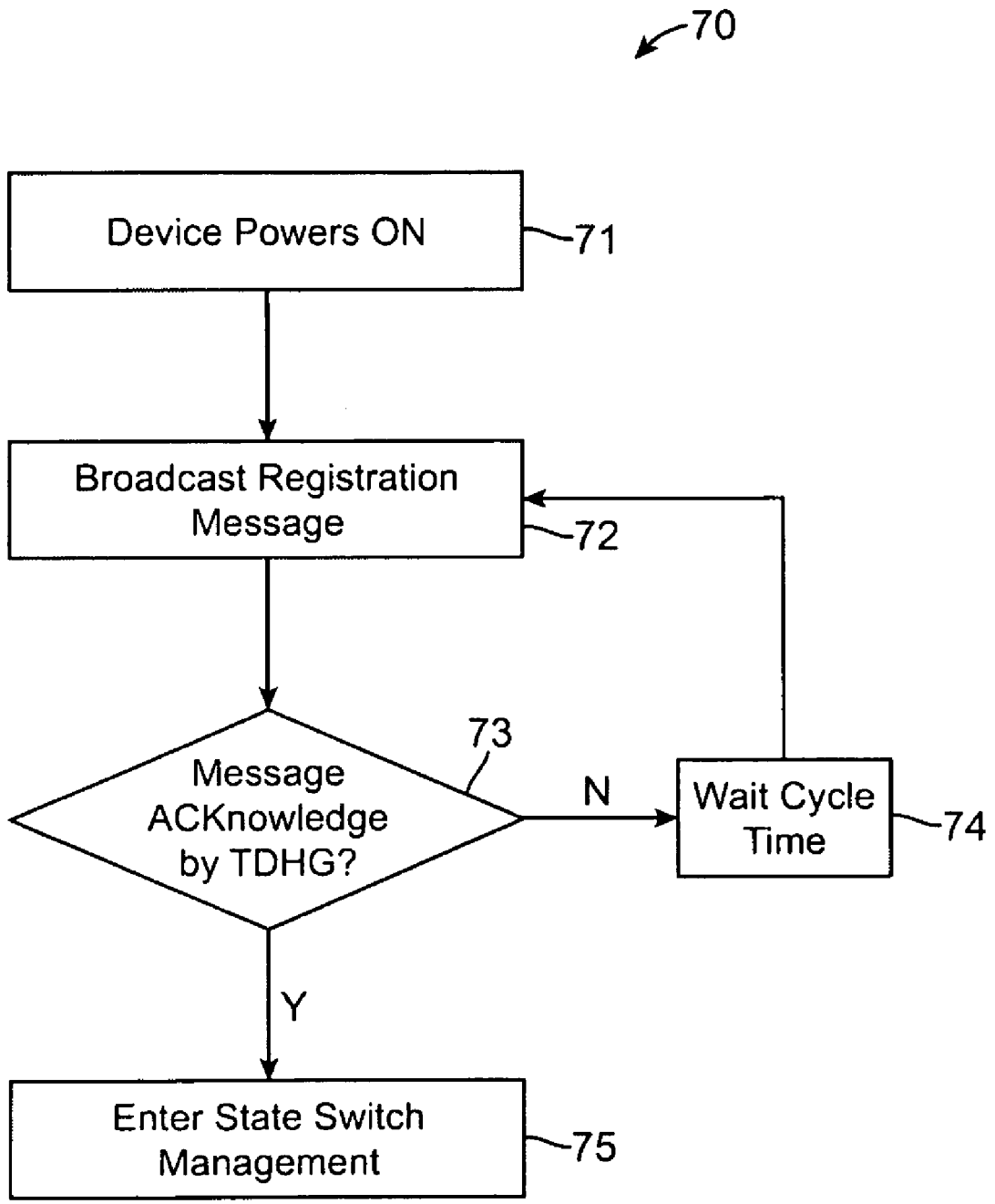
FIGS. 7-12 show flowcharts of processes including details of the process in FIG. 6, according to an embodiment of the invention.

FIG. 7 shows a flowchart of a power-ON process 70 for a MED, according to an embodiment of the invention. The MED power-on process includes:
Step 71: MED powers ON.
Step 72: MED broadcasts registration message.
Step 73: Message received and acknowledged by TDHG? If yes, proceed to step 75, else proceed to step 74.
Step 74: MED waits for a cycle time and proceeds back to step 72.
Step 75: MED enters state switch management process. End.

Figure 8:
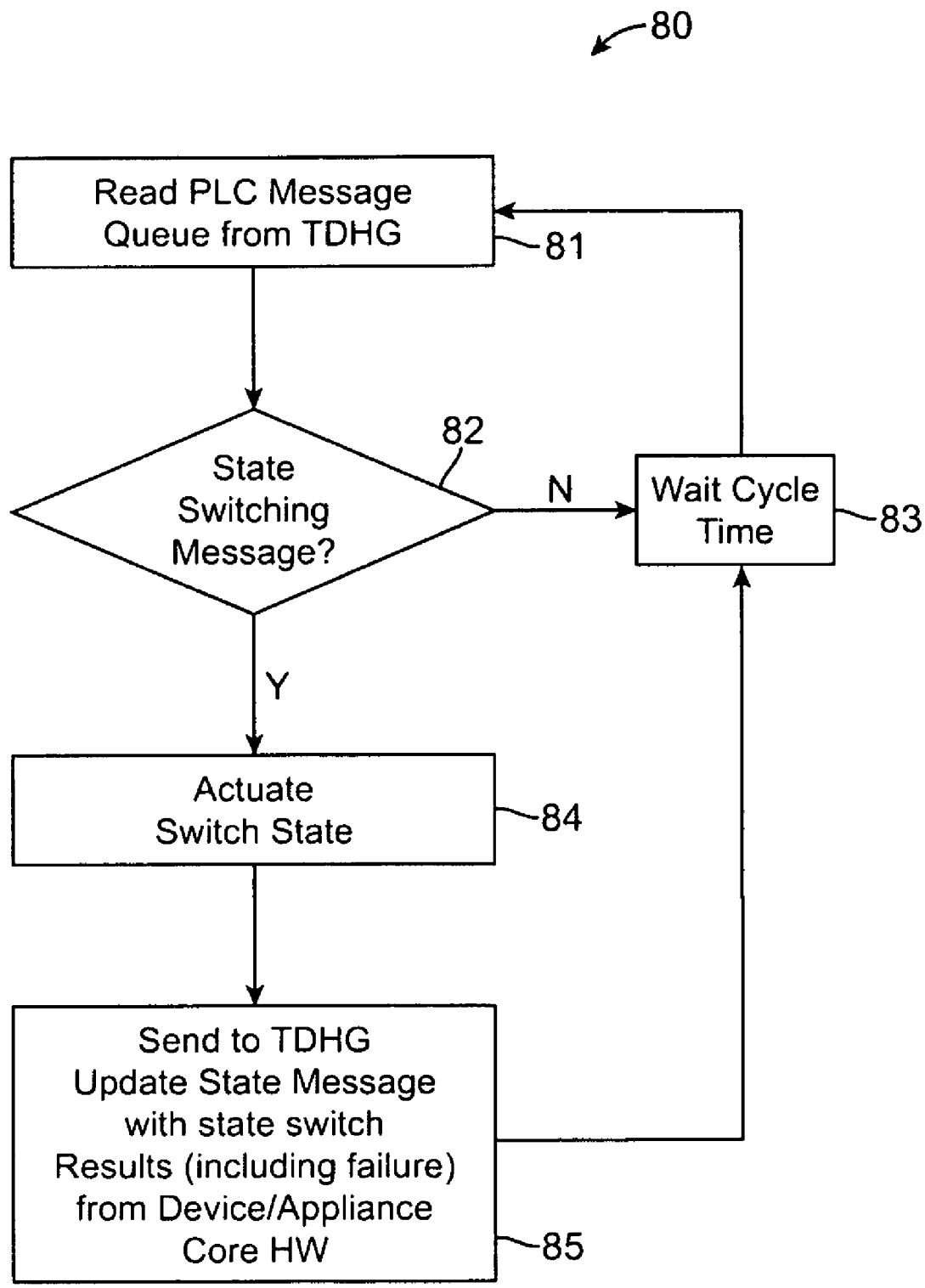

FIG. 8 shows a flowchart of a state switch management process 80 for a MED, according to an embodiment of the invention. The state switch management process includes:
Step 81: MED reads PLC message queue from TDHG.
Step 82: State switching message read? If not, proceed to step 83, else proceed to step 84.
Step 83: MED enters a wait cycle, and proceeds back to step 81.
Step 84: MED actuate state switching.
Step 85: Send to TDHG an update state message with state switching results (including failure) from device/appliance core HW.

Figure 9:
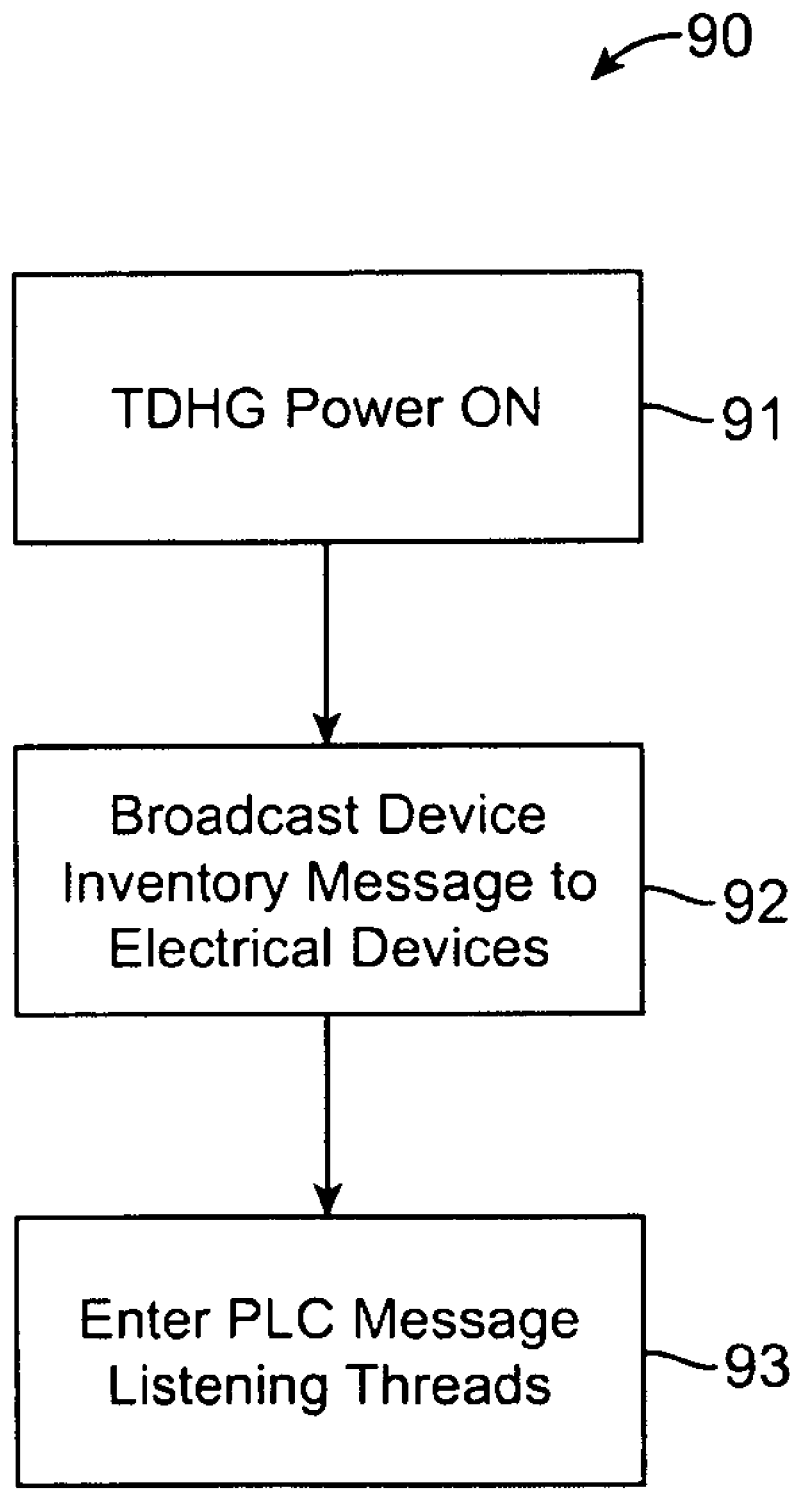

FIG. 9 shows a flowchart of a TDHG power-on process 90 for a MED, according to an embodiment of the invention. The TDHG power-on process includes:
Step 91: TDHG powers ON.
Step 92: TDHG broadcasts device inventory/discovery message to electrical devices (e.g., MEDs).
Step 93: TDHG enters PLC message listening process threads.

Figures 10A, 10B:
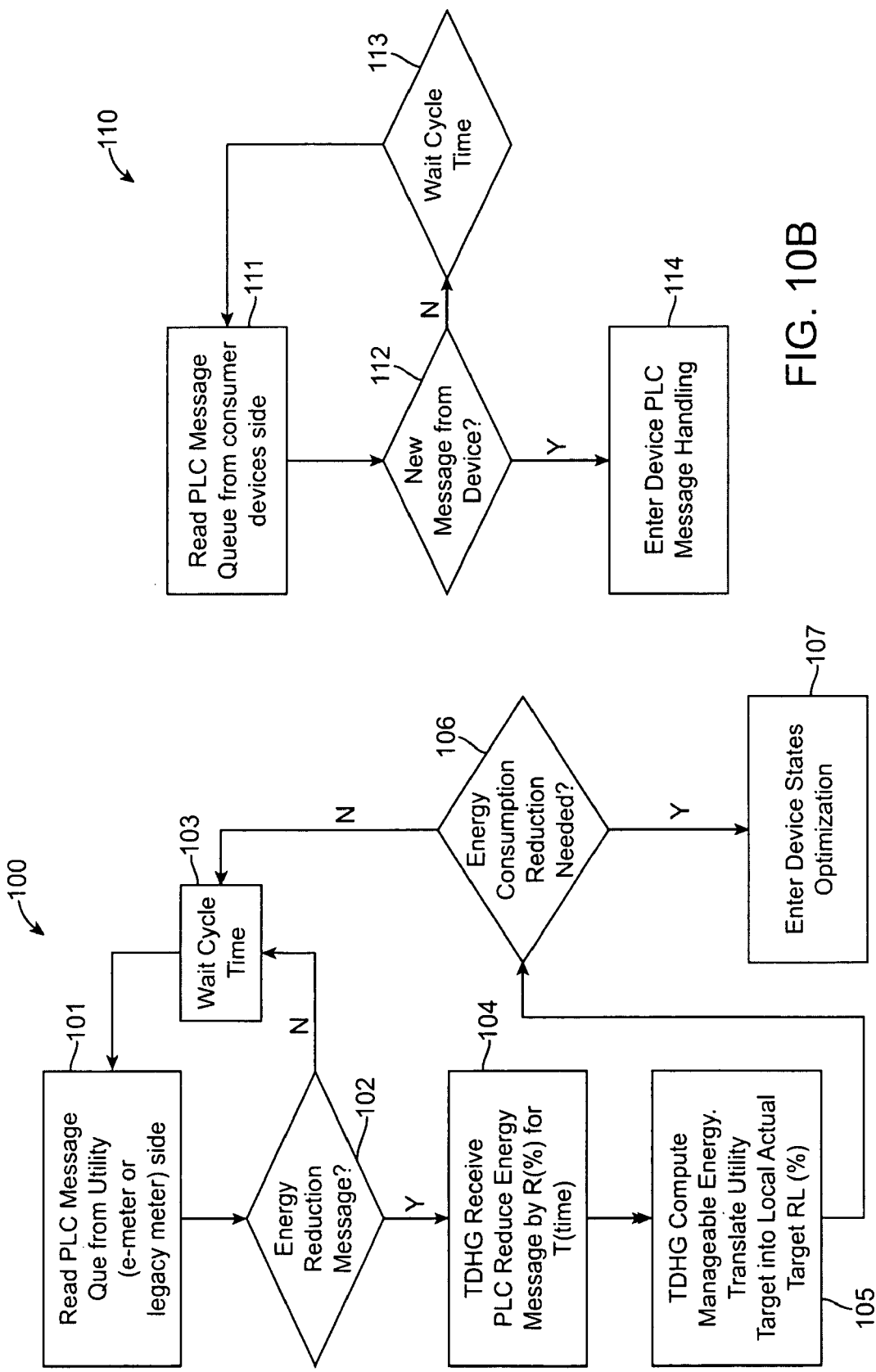

FIG. 10A shows a flowchart of a process 100 for a PLC message listening process thread, according to an embodiment of the invention. The listening process 100 includes:
Step 101: Read PLC message queue from utility (e-meter or legacy meter) side.
Step 102: Energy reduction message read? If yes, proceed to step 104, else proceed to step 103.
Step 103: Wait a cycle period. Proceed back to step 101.
Step 104: TDHG receives PLC message to reduce site energy consumption by R(%) for time period T.
Step 105: TDHG computes manageable energy (translates utility target reduction amount R into local actual target reduction RL(%)).
Step 106: TDHG determines if energy consumption reduction is needed? If yes, proceed to step 107, else proceed back to step 103.
Step 107: TDHG enter MED state optimization process.

FIG. 10B shows a flowchart of another process 110 for a PLC message listening process thread, according to an embodiment of the invention. The listening process 110 includes:
Step 111: Read PLC message queue from consumer devices (MED) side.
Step 112: New message from MED device? If yes, proceed to step 114, else proceed to step 113.
Step 113: Wait cycle time. Proceed to step 111.
Step 114: TDHG enter device PLC message handling.

Figure 11:
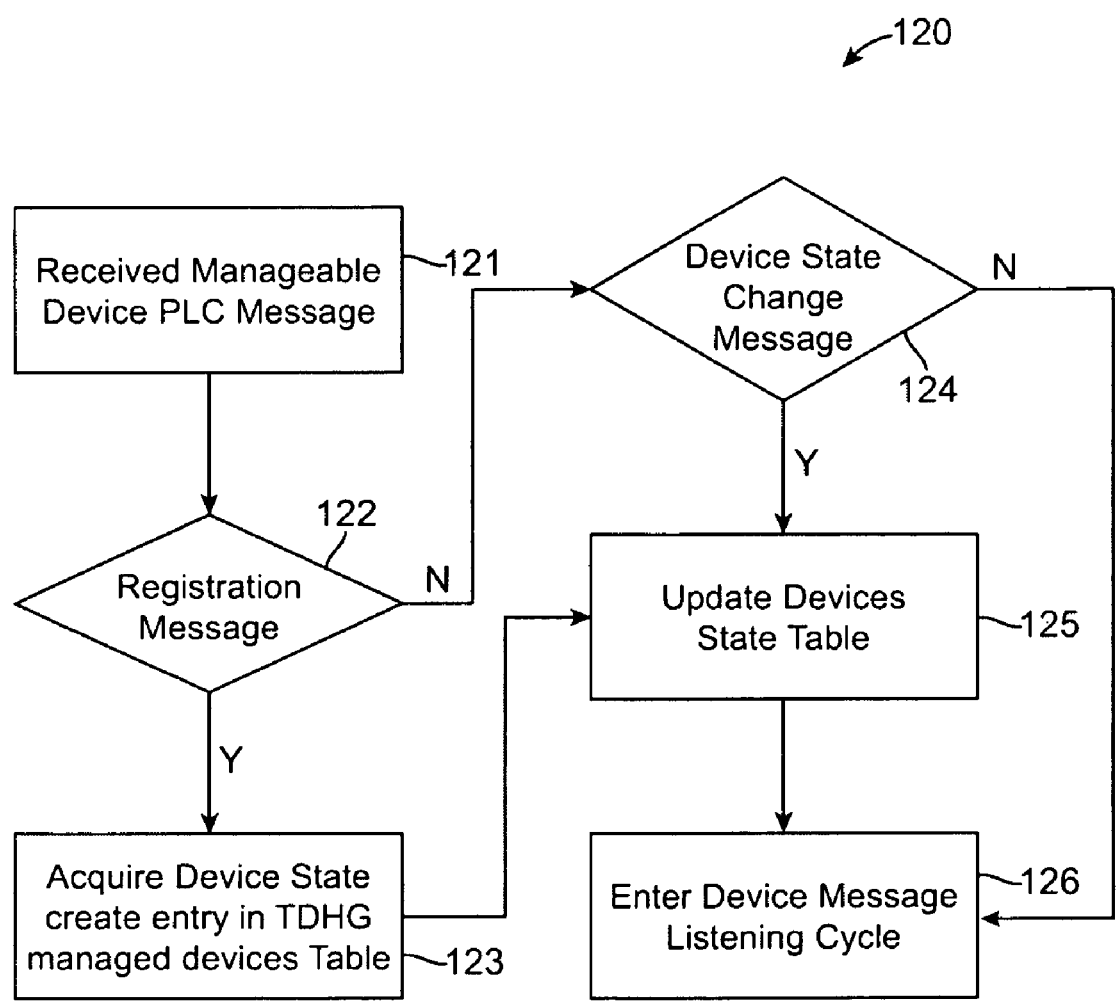

FIG. 11 shows a flowchart of MED PLC message handling process 120 for the TDHG, according to an embodiment of the invention. The process 120 includes:
Step 121: Receive MED PLC message.
Step 122: If the received message if a registration message, proceed to step 123, else proceed to step 124.
Step 123: Acquire device state information and create entry in TDHG managed devices table. Proceed to step 125.
Step 124: Is the message a device state change message? If yes, proceed to step 125, else proceed to step 126.
Step 125: Update devices state table in TDHG.
Step 126: Enter device message listening cycle.

Figure 12:
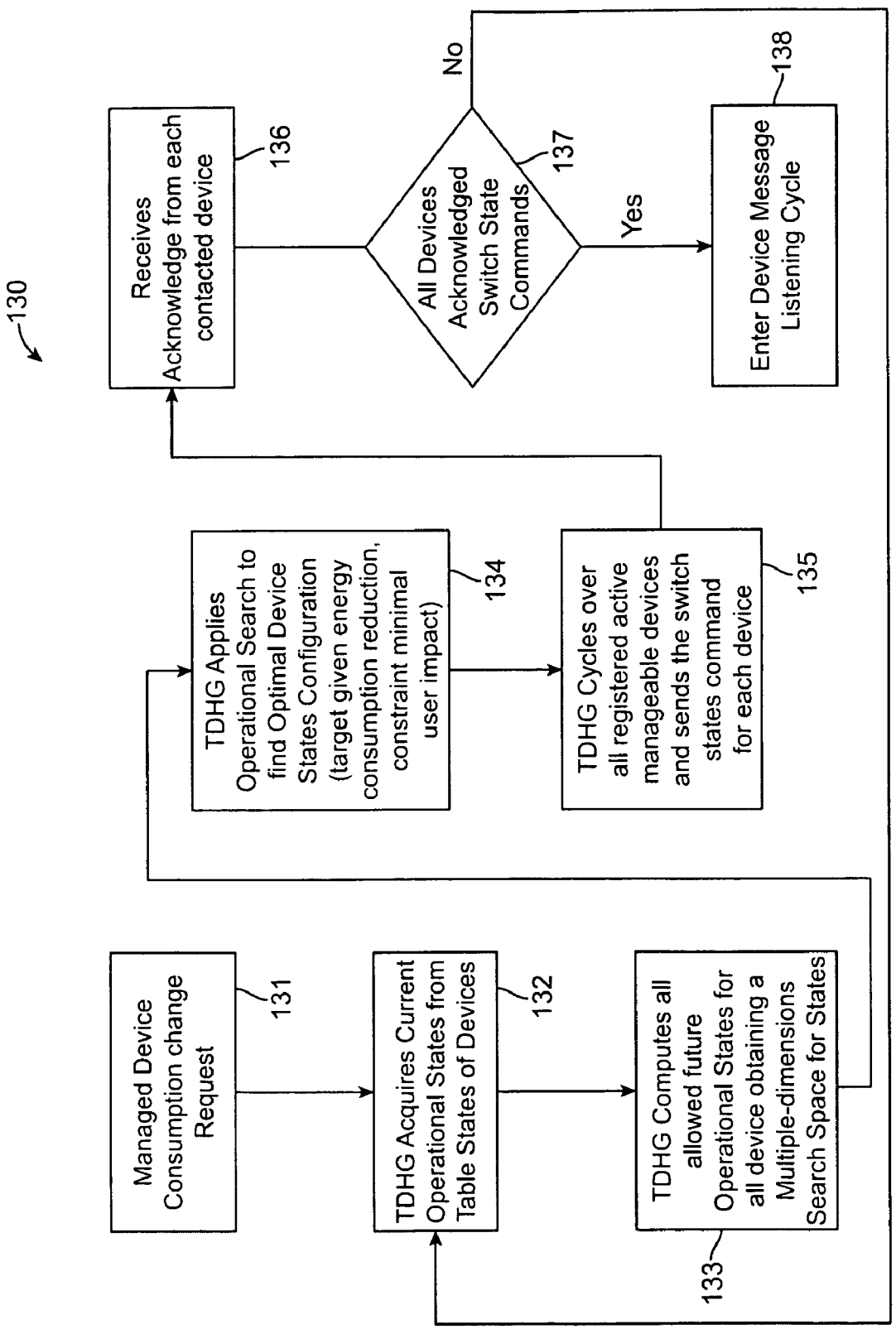

FIG. 12 shows a flowchart of a TDHG process 130 for optimized energy consumption, according to an embodiment of the invention. The process 130 includes:

Step 131: TDHG receive MED consumption change request.

Step 132: TDHG acquires current operational states of MEDs from table states for the devices.

Step 133: TDHG computes all allowed future operational states for all MEDs obtaining a multiple-dimensions search space for device states.

Step 134: TDHG applies an operations search algorithm to find optimal device states configuration (objective: target given energy consumption reduction, constraint: minimal user impact).

Step 135: TDHG cycles over all registered active manageable devices and sends switch states command for each MED involved.

Step 136: TDHG listens to received acknowledgements from each contacted MED.

Step 137: If all MEDs acknowledged switch states commands, the process proceeds to step 138, else the process proceeds back to step 132.

Step 138: TDHG enter device message listening cycle.

As is known to those skilled in the art, the aforementioned example architectures described above, according to the invention, can be implemented in many ways, such as program instructions for execution by a processor, as software modules, microcode, as computer program product on computer readable media, as logic circuits, as application specific integrated circuits, as firmware, etc. Further, embodiments of the invention can take the form of an entirely hardware embodiment, an entirely software embodiment or an embodiment containing both hardware and software elements. Though the invention has been described with reference to certain versions thereof; however, other versions are possible. Therefore, the spirit and scope of the appended claims should not be limited to the description of the preferred versions contained herein.

The terms "computer program medium," "computer usable medium", "computer readable medium", and "computer program product", "are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium, such as a network link and/or a network interface, including a wired network or a wireless network, that allows a computer to read such computer readable information. Computer programs (also called computer control logic) are stored in main memory and/or secondary memory. Computer programs may also be received via a communications interface. Such computer programs, when executed, enable the computer system to perform the features of the invention as discussed herein. In particular, the computer programs, when executed, enable the processor multi-core processor to perform the features of the computer system. Accordingly, such computer programs represent controllers of the computer system.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method of electricity consumption profile management for electrical devices, comprising:

receiving an energy consumption control command at a consumer site including one or more electrical devices connected to an energy distribution network, wherein the energy consumption control command includes an on demand energy consumption adjustment request from an energy utility for adjusting energy consumption at the consumer site by a given amount for a given time period;

determining energy consumption adjustment including determining an energy consumption adjustment for at least one of the electrical devices based on the energy consumption control command; and transmitting an energy consumption adjustment message to said at least one of the electrical devices, commanding the electrical device to adjust its electrical energy consumption by transitioning from a first energy consumption state to a second energy consumption state in response to the energy consumption adjustment message.

2. The method of claim 1 further comprising:

after the given time period has expired, transmitting an energy consumption adjustment expiration message to said at least one of the electrical devices, notifying the electrical device to transition to a different energy consumption state.

3. The method of claim 1 wherein:

multiple electrical devices in a consumer site are connected to the distribution network;

determining energy consumption adjustment includes determining an energy consumption adjustment for each of plural electrical devices in the consumer site based on the energy consumption control command; and transmitting an energy consumption adjustment message further includes transmitting a energy consumption adjustment message to each of the plural devices, commanding each of the plural electrical devices to adjust its electrical energy consumption accordingly.

4. The method of claim 3 wherein:

determining energy consumption adjustment further includes:

determining energy consumption states of each the plural devices, wherein each energy consumption state indicates a corresponding energy consumption level different from other energy consumption states of the electrical device; and determining an energy consumption adjustment for each of plural electrical devices further includes determining an energy consumption state for each of the plural electrical devices based on the energy consumption control command; and transmitting an energy consumption adjustment message to each of the plural devices includes transmitting a state transition message to each of the plural devices based on the determined energy consumption energy adjustment for each device; and at each of the plural electrical devices, transitioning the electrical device to an energy consumption state as necessary, in compliance with the state transition message in the energy consumption adjustment message.

5. The method of claim 4 wherein transmitting an energy consumption adjustment message to each of the plural devices includes transmitting an energy consumption adjustment message to each of the plural devices via message-based protocol communication on the power lines in the consumer site.

6. The method of claim 1 further including:
a central utility management system determining, and transmitting, an energy consumption control message to one or more consumer sites via the energy distribution network;
wherein receiving an energy consumption control command at a consumer site includes receiving an energy consumption control command at a consumer site from the central utility management system via the energy distribution network.

7. The method of claim 1 further including providing a gateway at the consumer site, and at the gateway performing said steps of determining energy consumption adjustment and transmitting an energy consumption adjustment message.

8. An apparatus for electricity consumption profile management for electrical devices, comprising:
an interface configured for receiving an energy consumption control command at a consumer site including one or more electrical devices connected to an energy distribution network, wherein the energy consumption control command includes an on demand energy consumption adjustment request from an energy utility for adjusting energy consumption at the consumer site by a given amount for a given time period; and
a control module employing a processor configured for determining energy consumption adjustment including determining an energy consumption adjustment for at least one of the electrical devices based on the energy consumption control command, and transmitting an energy consumption adjustment message to said at least one of the electrical devices, commanding the electrical device to adjust its electrical energy consumption by transitioning from a first energy consumption state to a second energy consumption state in response to the energy consumption adjustment message.

9. The apparatus of claim 8 wherein:
multiple electrical devices in a consumer site are connected to the distribution network;
the control module is further configured for determining an energy consumption adjustment for each of plural electrical devices in the consumer site based on the energy consumption control command, and transmitting an energy consumption adjustment message to each of the plural devices, commanding each of the plural electrical devices to adjust its electrical energy consumption accordingly.

10. The apparatus of claim 9 wherein the control module is further configured such that:
determining energy consumption adjustment further includes:
determining energy consumption states of each the plural devices, wherein each energy consumption state indicates a corresponding energy consumption level different from other energy consumption states of the electrical device; and
determining an energy consumption adjustment for each of plural electrical devices further includes determining an energy consumption state for each of the plural electrical devices based on the energy consumption control command; and
transmitting an energy consumption adjustment message to each of the plural devices further includes: transmitting a state transition message to each of the plural devices based on the determined energy consumption energy adjustment for each device.

11. The apparatus of claim 10 wherein the control module is further configured for transmitting an energy consumption adjustment message to each of the plural devices via message-based protocol communication on the power lines in the consumer site.

12. The apparatus of claim 8 wherein the interface is further configured for receiving an energy consumption control command at a consumer site from a central utility management system via the energy distribution network, the central utility management system determining, and transmitting, an energy consumption control message to one or more consumer sites via the energy distribution network.

13. A system for electricity consumption profile management for electrical devices, comprising:
a management gateway including:
an interface configured for receiving an energy consumption control command at a consumer site including one or more electrical devices connected to an energy distribution network, wherein the energy consumption control command includes an on demand energy consumption adjustment request from an energy utility for adjusting energy consumption at the consumer site by a given amount for a given time period; and
a control module employing a processor configured for determining energy consumption adjustment including determining an energy consumption adjustment for at least one of the electrical devices based on the energy consumption control command, and transmitting an energy consumption adjustment message to said at least one of the electrical devices, commanding the electrical device to adjust its electrical energy consumption accordingly; and
a controller for each electrical device, the controller configured for receiving energy consumption adjustment message from the gateway and transitioning the electrical device to an energy consumption state in compliance with the energy consumption adjustment message.

14. The system of claim 13 wherein:
multiple electrical devices in a consumer site are connected to the distribution network; and
the control module is further configured for determining an energy consumption adjustment for each of plural electrical devices in the consumer site based on the energy consumption control command, and transmitting an energy consumption adjustment message to each of the plural devices, commanding each of the plural electrical devices to adjust its electrical energy consumption accordingly.

15. The system of claim 14 wherein the control module is further configured such that:
determining energy consumption adjustment further includes:
the control module exchanging messages with the controller for each electrical device for determining energy consumption states of each of the plural devices, wherein each energy consumption state indicates a corresponding energy consumption level different from other energy consumption states of the electrical device;

determining an energy consumption adjustment for each of plural electrical devices further includes determining an energy consumption state for each of the plural electrical devices based on the energy consumption control command; and transmitting an energy consumption adjustment message to each of the plural devices further includes: transmitting a state transition message to each of the plural devices based on the determined energy consumption energy adjustment for each device.

16. The system of claim 15 wherein the control module is further configured for transmitting an energy consumption adjustment message to each of the plural devices via message-based protocol communication on the power lines in the consumer site.

17. The system of claim 15 wherein the controller for each electrical device is further configured for transitioning the electrical device to an energy consumption state as necessary, in compliance with the state transition message in the energy consumption adjustment message.

18. The system of claim 15 wherein the controller for each electrical device includes:

a state management module and a state switching interface module, the state management module configured for receiving energy consumption adjustment message from the gateway and generating corresponding state transition commands to the state switching interface module, and the state switching interface module is configured for transitioning the electrical device to energy consumption states in compliance with the state transition commands from the state management module.

19. The system of claim 15 wherein the management gateway and each controller include message-based protocol communication modules for message exchange therebetween via electrical power lines at the consumer site to which the gateway and each controller are connected wherein the message-based protocol includes messages exchanged on one of power line communication (PLC) protocols.

20. The system of claim 13 wherein the interface is further configured for receiving an energy consumption control command at a consumer site from a central utility management system via the energy distribution network, the central utility management system determining, and transmitting, an energy consumption control message to one or more consumer sites via the energy distribution network.

* * * * *